(12) United States Patent
Schuh et al.

(10) Patent No.: US 8,635,096 B2
(45) Date of Patent: Jan. 21, 2014

(54) METHOD AND SYSTEM FOR ADAPTING A PRODUCTION FLOW SCHEDULE FOR A PRODUCTION PROCESS

(71) Applicant: ABB Technology AG, Zürich (CH)

(72) Inventors: Lothar Schuh, Plankstadt (DE); Christian Stich, Hirschberg-Leutershausen (DE)

(73) Assignee: ABB Technology AG, Zürich (CH)

( * ) Notice: Subject to any disclaimer, the term of this patent is extended or adjusted under 35 U.S.C. 154(b) by 0 days.

(21) Appl. No.: 13/690,811

(22) Filed: Nov. 30, 2012

(65) Prior Publication Data

US 2013/0096975 A1 Apr. 18, 2013

Related U.S. Application Data

(63) Continuation of application No. PCT/EP2011/002593, filed on May 25, 2011.

(30) Foreign Application Priority Data

Jun. 2, 2010 (DE) .......................... 10 2010 022 462

(51) Int. Cl.
*G06Q 40/00* (2012.01)
(52) U.S. Cl.
USPC ........................................ 705/7.11; 705/7.42
(58) Field of Classification Search
USPC ................................................ 705/7.42, 7.11
See application file for complete search history.

(56) References Cited

U.S. PATENT DOCUMENTS

| 7,274,975 | B2 * | 9/2007 | Miller ........................... 700/295 |
| 2003/0009265 | A1 * | 1/2003 | Edwin ............................ 700/295 |
| 2003/0041017 | A1 * | 2/2003 | Spool et al. ...................... 705/37 |
| 2005/0258154 | A1 * | 11/2005 | Blankenship et al. ... 219/130.01 |
| 2007/0032911 | A1 * | 2/2007 | Clesle et al. .................. 700/291 |
| 2009/0307037 | A1 | 12/2009 | King |

FOREIGN PATENT DOCUMENTS

| EP | 1263108 | 12/2002 |
| EP | 1748529 | 1/2007 |
| JP | 2006301700 | 11/2006 |

OTHER PUBLICATIONS

*International Search Report issued on Aug. 23, 2011, by the European Patent Office for International Appl. No. PCT/EP2011/002593.

* cited by examiner

*Primary Examiner* — Thomas Dixon
*Assistant Examiner* — Benjamin S Fields
(74) *Attorney, Agent, or Firm* — Buchanan Ingersoll & Rooney PC

(57) ABSTRACT

A method and system are disclosed for adapting a production flow schedule for one or more production processes, each having one or more process steps that use power for the execution thereof. An exemplary method includes identifying at least one availability time window in which there is a predetermined minimum power availability within a predetermined optimization time period based on a piece of availability information which indicates a forecast power availability during the optimization time period; providing an indication of one or more flexible process steps, which can be executed in a plurality of alternative time windows within the optimization time period; and for each of the flexible process steps, temporally rearranging the corresponding flexible process step into one of the corresponding alternative time windows if the rescheduling is within the availability time window in order to obtain an adapted production flow schedule.

21 Claims, 2 Drawing Sheets

METHOD AND SYSTEM FOR ADAPTING A PRODUCTION FLOW SCHEDULE FOR A PRODUCTION PROCESS

RELATED APPLICATIONS

This application claims priority as a continuation application under 35 U.S.C. §120 to PCT/EP2011/002593, which was filed as an International Application on May 25, 2011 designating the U.S., and which claims priority to German Application 10 2010 022 462.6 filed in Germany on Jun. 2, 2010. The entire contents of these applications are hereby incorporated by reference in their entireties.

FIELD

The disclosure relates to production planning, and the control of production in a production plant that draws energy from intelligent electrical power networks, based on a production flow schedule.

BACKGROUND INFORMATION

As a result of environmental factors such as wind strength, clouds and similar factors, non-centralized, renewable sources of power can provide energy irregularly and unpredictably. Due to the increasing use of these sources of energy, the mismatch between the quantity of electrical energy generated and the quantity of electrical energy consumed is becoming noticeably greater. In the past, electrical energy was generated by power stations in a quantity according to reasonably reliable predictions about the consumption behavior of industry and households. In the future, it is estimated that up to 30% of electrical energy can be generated without any synchronization to demand.

The production of electrical energy that is not synchronized with consumption can be accepted by the power station or network operators in accordance with statutory regulations, and fed into the power network.

Because the price of electrical power reflects the availability of electrical energy in the energy network, as a result of the over-supply, electrical energy, for example, can be made available at certain times free of charge. For example, if wind power stations generate a large quantity of electrical energy on a Sunday, this may not meet with an adequate demand from industrial consumers, who are the largest users of electrical energy. Thus, there may not be an opportunity for industry to benefit from the exploitation of economical electrical energy. Alternatively, adequate demand can arise primarily in countries where the use of renewably generated electrical energy can be mandatory, even when the supply of electrical energy does not meet with a corresponding demand.

For example, individual process steps in production plants have been carried out in predetermined time windows or continuously, whereby the sequence and the scheduling of individual process steps can be optimized from the point of view of production passage time or throughput.

In accordance with an exemplary embodiment, the present disclosure provides a method and apparatus for preparing a production flow schedule whereby a production plant can be operated with better exploitation of excess electrical energy.

SUMMARY

A method is disclosed for adapting a production flow schedule for one or more production processes, at least some of the one or more processes including one or more process steps that use energy for their execution, the method comprising: identifying at least one availability time window in which a predetermined minimum energy availability is present within a predetermined optimization period based on availability information that indicates a forecast energy availability during the optimization period; indicating one or more flexible process steps, wherein the one or more flexible process steps specify those process steps that can be executed in one or more alternative time windows within the optimization period without impairing one or more optimization variables on which preparation of the production flow schedule is based; and for each of the flexible process steps, rescheduling an appropriate flexible process step into a relevant alternative time window if the rescheduling is within the at least one availability time window, in order to obtain an adapted production flow schedule.

A production planning system is disclosed for adapting a production flow schedule for one or more production processes, at least some of the one or more processes including process steps using energy for their execution, wherein the production planning system is configured: to identify at least one availability time window in which a predetermined minimum energy availability is present within a predetermined optimization period based on availability information that indicates a forecast energy availability during the optimization period; to indicate one or more flexible process steps, wherein the one or more flexible process steps specify those process steps that can be executed in one or more alternative time windows within the optimization period without impairing one or more optimization variables on which the preparation of the production flow schedule is based; and for each of the flexible process steps, to reschedule the appropriate flexible process step into one of the relevant alternative time windows if the rescheduling is within the availability time window in order to obtain an adapted production flow schedule.

A computer program product is disclosed comprising a non-transitory computer readable medium having a computer readable code for adapting a production flow schedule for one or more production processes, at least some of the one or more processes including process steps that use energy for their execution, wherein the computer readable code will configure a computer to perform a method which includes: identifying at least one availability time window in which a predetermined minimum energy availability is present within a predetermined optimization period based on availability information that indicates a forecast energy availability during the optimization period; indicating one or more flexible process steps, wherein the one or more flexible process steps specify those process steps that can be executed in one or more alternative time windows within the optimization period without impairing one or more optimization variables on which the preparation of the production flow schedule is based; and for each of the flexible process steps, rescheduling the appropriate flexible process step into one of the relevant alternative time windows if the rescheduling is within the availability time window in order to obtain an adapted production flow schedule.

BRIEF DESCRIPTION OF THE DRAWINGS

The disclosure is explained below with reference to the exemplary embodiments shown in the drawings. In the drawings.

DETAILED DESCRIPTION

Figure 1:
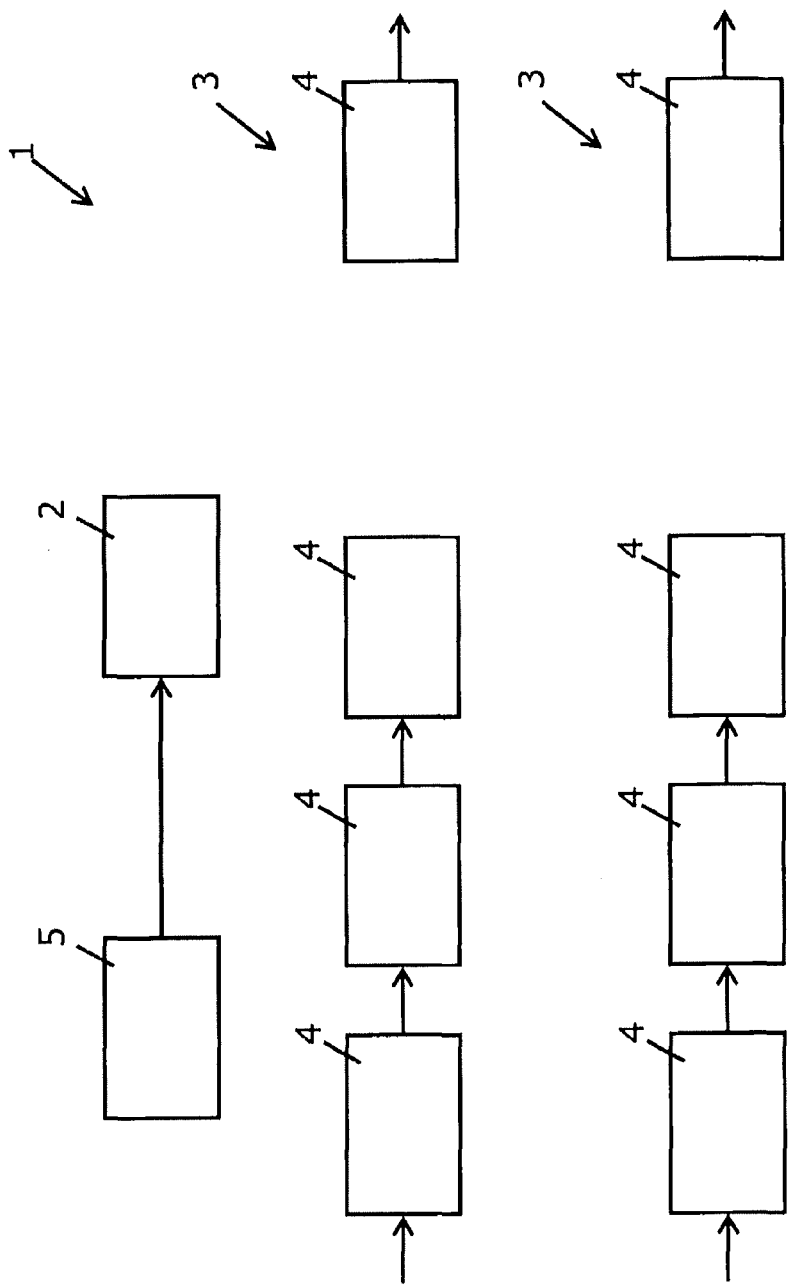
FIG. 1 is a schematic illustration of exemplary production processes, each with multiple process steps that are carried out under the control of a production control unit.

According to a first exemplary embodiment, a method is disclosed for adapting a production flow schedule for one or more production processes, each of which comprises one or more processes that can involve energy for their execution. The method can comprise: identifying at least one availability time window in which a predetermined minimum energy availability is present, within a predetermined optimization period, based on availability information that indicates a forecast energy availability during the optimization period; indicating one or more flexible process steps, wherein the one or more flexible process steps specify those process steps that can be executed in multiple alternative time windows within the optimization period, without impairing one or more optimization variables on which the preparation of the production flow schedule is based; and for each of the flexible process steps, rescheduling the appropriate flexible process step into one of the relevant alternative time windows if this is within the availability time window, in order to obtain an adapted production flow schedule.

In accordance with an exemplary embodiment, the time of execution of the individual process steps of the production process can be flexible. For example, the production process can be carried out within a first or a second time window, which can be intended for whichever time window in which a specific or higher energy availability exists or is expected. For example, those process steps of a production process that should be carried out within a future time window in order to achieve a predetermined optimization target are first determined with the aid of a production flow schedule. In addition, the forecast energy availability for the current point in time as well as the expected availability of electrical energy over time within the future time window can be provided or can be determined.

In accordance with an exemplary embodiment, through the rescheduling or retiming of one or more process steps into a time window in which high energy availability, for example, an over-supply of electrical energy, is present, serves on the one hand to exploit the generated electrical energy in a power network more effectively and, since the quantity of excess energy in a power network can also has an effect on the price of the power, it also allows the operators of production plants to obtain the electrical energy for operating the process steps more economically, and so to reduce production costs.

Furthermore, the predetermined minimum availability can be determined through an availability threshold value which, for example, can correspond to a mean value of the forecast availabilities within the optimization period.

According to an exemplary embodiment, the energy availability can indicate the excess of electrical energy in a power network. For example, the availability of electrical energy can be indicated on the basis of a price for a unit of energy.

In accordance with a further exemplary embodiment, the availability of electrical energy can also be provided for the alternative time window of a process step to be determined depending on a state magnitude of the process step, whereby, for example, the flexible process step is executed immediately as a function of instantaneous energy availability.

In accordance with another exemplary embodiment, the availability of electrical energy may be provided for the one or more flexible process steps to indicate those process steps that can be executed in multiple alternative time windows within the optimization period, without at least one optimization variable deviating by more than an optimization variable tolerance value from a value of the optimization variable that is achieved by the original production flow schedule.

For example, the step of rescheduling each of the appropriate flexible process steps can be carried out depending on a probability that is assigned to each forecast energy availability, whereby, for example, is given to rescheduling those flexible process steps into relevant time windows in which the probability of an energy availability being above the minimum energy availability is highest.

Furthermore, in the step of rescheduling each of the appropriate flexible process steps, priority can be given to considering those flexible process steps that have the highest energy consumption.

According to another exemplary embodiment, a production planning system is provided for adapting a production flow schedule for one or more production processes, each of which comprises one or more process steps that requires energy for their execution, whereby the production planning system is designed: to identify at least one availability time window in which a predetermined minimum energy availability is present, within a predetermined optimization period, based on availability information that indicates a forecast energy availability during the optimization period; to indicate one or more flexible process steps, whereby the one or more flexible process steps specify those process steps that can be executed in multiple alternative time windows within the optimization period, without impairing one or more optimization variables on which the preparation of a production flow schedule is based; and for each of the flexible process steps, to reschedule the appropriate flexible process step into one of the relevant alternative time windows if this is within the availability time window, in order to obtain an adapted production flow schedule.

According to a further exemplary embodiment, a production system with one or more production processes and with the production planning system described above is provided.

According to another exemplary embodiment, a computer program product is provided that comprises a program code which, when executed on a data processing unit, executes the above method for adapting a production flow schedule.

FIG. 1 shows a schematic illustration of an exemplary production system 1 with a production control unit 2 that monitors and controls one or more production processes 3. Each of the production processes 3 comprises a sequence of one or more process steps 4. An exemplary purpose of the production processes 3 is to fabricate one or more end products from one or more raw products or intermediate products. The process steps 4 use energy for their execution, which in the present exemplary embodiment is electrical energy.

The production control unit 2 is associated with a production planning system 5 that makes information about the time sequence of the individual process steps 4 available to the production control unit 2. For each process step 4, the information contains a starting time and specified magnitudes for the process step concerned, so that the production control unit 2 can initiate the process step concerned at the specified starting time, and supplies the specified magnitudes, magnitudes derived from them, or similar data to the production equipment associated with the process step.

The production planning system 5 prepares a production flow schedule depending on known production parameters for the individual process steps 4, and depending on an optimization function that optimizes the production processes 3 in relation to one or more magnitudes. The optimization is achieved through appropriate scheduling of the individual process steps 4, so that the end product can be manufactured according to a predetermined optimization target, for example, within the predetermined time and/or in the predetermined number and/or quality. The optimization is carried out, for example, for the purpose of minimizing the production time of a product that is to be manufactured. In accordance with an exemplary embodiment, the optimization can be carried out with the aid of known optimization methods that are familiar from known methods and/or systems The individual process steps 4 use electrical energy for their execution, the quantity of which can depend on the nature of the process step concerned. In addition, the individual process steps 4 exhibit greater or lesser flexibility in respect of the period of time in which they can be carried out without delaying the fabrication of the end product or reducing the number of the end products produced within a period of time. For example, a process step 4 may in some cases be carried out in multiple alternative time windows which do or do not overlap, without impairing the one or more optimization variables of the result of the production process 3 or of the multiple production processes 3.

As disclosed herein, the availability of electrical energy can vary as a result of the increasing use of unsynchronized sources of electrical energy. For example, as a result of which there can be periods during which unused electrical energy is available in the power networks. Although intelligent power networks attempt to consume or to store the electrical energy at appropriate locations, this approach cannot, however, completely cope with the almost random production of electrical energy in the future.

In accordance with an exemplary embodiment, in intelligent power networks, the availability of information describing the current availability of the electrical energy can be obtained, for example, an indication about the local generation and the quantity of excess electrical energy. Availability information can, moreover, also contain indications of how the availability of electrical energy in the power network will develop over time and location, in the near future, for example, over the coming 24 to 28 hours, and the amount that will be available. For example, the availability information can either also contain an indication of the period, and for what duration, an excess of electrical energy will be present, or this indication can be derived from it. It is also possible for the availability information to contain indications of the probability with which a forecast availability will be available at a given time or over a period of time in the future. These indications can, for example, be derived from weather forecasts and similar data. The availability information is made available to the production planning system 5. The availability information can be obtained via the intelligent power network itself, or from other sources.

In addition to the availability information provided, which gives an indication of the current availability of electrical energy and the forecast availability of the electrical energy over a future optimization period, process parameters are also made available to the production planning system 5. The availability information can indicate the current availability of electrical energy and the forecast availability of electrical energy in the form of a current or forecast price for electrical energy, e.g. the price per kWh. For example, this price is variable, and depends heavily on the availability, and the probability that the forecasts of the availability of electrical energy are correct.

Figure 2:
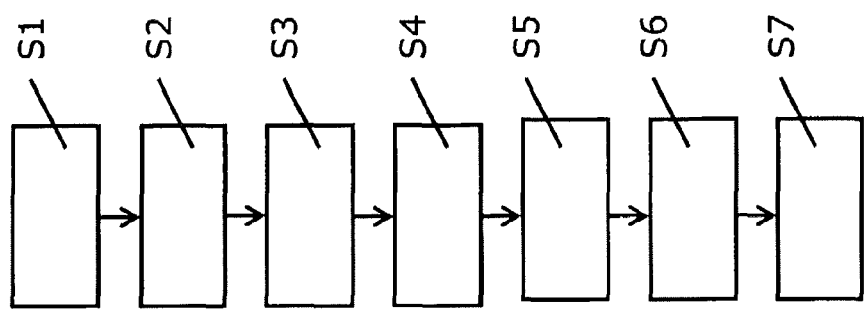
FIG. 2 is a flow diagram illustrating an exemplary method of preparing or adapting a production flow schedule based on availability information regarding electrical energy.

FIG. 2 illustrates an exemplary method for adapting a production flow schedule for one or more production processes with the aid of a flow diagram. The production flow schedule is carried out with the aid of the production control unit 2.

In step S1, availability information about the availability of electrical energy is received via the power network, the Internet or from some other source of information. The availability information includes indications of a current availability of electrical energy and of the forecast availability of electrical energy in the course of an optimization period that is in the future. For example, the reliability of the indication of the forecast availability of electrical energy in the optimization period can be assigned probabilities that have been prepared on the basis of weather forecasts and similar data.

On the basis of the probabilities and of the availabilities of electrical energy, specific time windows within the period under consideration are determined in step S2, within which the consumption of electrical energy can be increased, since the price for electrical energy is low there, or within which an excess of electrical energy is available. The time windows can, for example, be determined in that the indication of availability contained in the availability information for the relevant time window is compared with an availability threshold value, and the time windows determined as those periods of time during which the availability is below the availability threshold value. The availability threshold may be fixedly predetermined, or may be determined on the basis of the forecast availability of electrical energy. The availability threshold value can, for example, correspond to a mean value of the energy availability during the optimization period, or may depend thereon. Other possibilities with which the time windows may be determined are also conceivable.

As a result, time windows are found within which the highest possible energy consumption for the production processes 3 is desired, since in these time windows, the availability of energy is at its highest. Rescheduling individual process steps into these time windows can synchronize the times of energy consumption with the times in which excess energy is available. For example, since the price of electricity usually reflects this availability, the operator of the production plant can lower production costs due to the lower costs for the electrical energy.

In step S3 the production flow schedule for the specified optimization period, which is specified by the production planning system 5, is used to identify those process steps 4 that are characterized by time flexibility, as flexible process steps, for example, process steps that can be carried out in alternative time windows without deviating from the optimization target on which the production flow schedule is based, for example, without impairing the optimization variable, which is determined by an optimization procedure on which the initial production flow schedule is based. For example, the process steps 4 that can be carried out in alternative time windows without changing or impairing the overall production time of the end product or the throughput of the production process, are determined.

For example, the flexible process steps can indicate those process steps that can be executed in multiple alternative time windows within the optimization period without at least one optimization variable deviating by more than an absolutely or relatively predetermined optimization variable tolerance value from a value of the optimization variable that would be achieved by implementing the original (initial) production flow schedule.

In step S4 the alternative time windows in which process steps can alternatively be executed are compared with the time windows of high energy availability determined in step S2, and in step S5, those flexible process steps 4 which, deviating from the prior production flow schedule, can be moved to one of the time windows with high energy availability, are determined. A decision regarding those process steps 4 of which the execution can flexibly be moved between alternative time windows may also take into account whether the process steps can be interrupted during the performance of the individual process step in case, for example, the availability of electrical energy suddenly falls and reaches a level below the availability threshold value, or the price exceeds an energy price threshold value.

In a subsequent step S6, a modified production flow schedule is prepared, in which the flexible process steps previously identified in step S5 are moved into the relevant alternative time windows if, in the original time window for one of the identified process steps, a lower availability of electrical energy is present than in the alternative time window to which the process step concerned has been assigned according to step S5.

The rescheduling of the appropriate flexible process steps can, moreover, be carried out depending on a probability that is assigned to each forecast availability of electrical energy. For example, it is possible to give priority to temporally moving those flexible process steps into appropriate time windows in which the probability of an energy availability is furthest above the availability threshold value.

A check is made in step S7 as to whether the movement of the process steps 4 in step S6 interferes with the overall production process in such a way that an optimization variable, (for example, throughput, production time etc.) has been impaired. This is carried out for every process step whose time has been previously moved in step S6, and the movement is not made if an impairment in the optimization variable has been found.

In accordance with an exemplary embodiment, the method for the optimization of one or more production processes 3 based on the available information, which indicates the availability of electrical energy described in general terms above can, for example, be applied in a chipboard factory. In a chipboard factory, 30% of the electrical energy is used for the mechanical wood processing in which wood chips are manufactured from logs. For example, on the basis of forecast night storms that can lead to high energy availability because of the wind power stations connected to the power network, the production planning system 5 can decide on the basis of the forecast data that is made available and the process parameters, including a consideration of stock levels, whether it would be advantageous to reschedule the manufacture of the wood chips to an alternative time window and, for example, to carry it out during the night. The production planning system 5 can then appropriately adapt the production process 3 or the production processes 3.

According to a further example, the above disclosed method for adapting a production flow schedule can be relevant to large refrigerated warehouses in which the cooling to a temperature consumes a great deal of energy. For example, it is possible to regard the holding of goods to be refrigerated in readiness as a production process or as part of one. In addition, a control system can use the forecast of the availability of the electrical energy to start the cooling process.

Refrigeration processes of this type are often controlled by a two-point control system. For example, the refrigeration equipment used to refrigerate the building can be switched on as soon as the temperature exceeds a first temperature threshold, and can be switched off as soon as the temperature falls below a second temperature threshold that is lower than the first temperature threshold. Depending on the availability of the electrical energy, both the first temperature threshold and the second temperature threshold can be adapted when there is a high availability of electrical energy, or conversely can be raised as soon as the availability of electrical energy is low. The shift in the temperature thresholds results in a relative shift in the time windows during which the refrigeration is switched on. For example, in the event of high availability of electrical energy, the refrigeration can cool the cold room down to a lower temperature, which can achieve greater flexibility. In accordance with an exemplary embodiment, when the availability of energy falls, it is possible to wait longer before switching the refrigeration on again, since the temperature of the cold room may not exceed the critical temperature at which the refrigeration has to be switched on again until later, regardless of the availability of electrical energy or of the price of electricity.

As a further example, the method and system as disclosed herein can be used for the charging of batteries in a production process, for example, in order to operate fork-lift trucks or other vehicles. In accordance with an exemplary embodiment, the time windows for charging the batteries can equally be selected independently of the energy availability. For example, the charging of fork-lift truck batteries can be carried out during the night or over the weekend when the availability of energy is high.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMBERS

1 Production system
2 Production control unit
3 Production process
4 Process step
5 Production planning system

What is claimed is:

1. A method for adapting a production flow schedule for one or more production processes, at least some of the one or more processes including one or more process steps that use energy for their execution, wherein the production flow schedule is initially generated depending on an optimization function that optimizes the production processes in relation to one or more optimization variables, by causing a data processing unit to execute functions of:

identifying at least one availability time window in which a predetermined minimum energy availability is present within a predetermined optimization period based on availability information that indicates a forecast energy amount during the optimization period;

identifying one or more process steps that are characterized by time flexibility as flexible process steps, wherein the one or more flexible process steps that can be executed in one or more alternative time windows within the optimization period without at least one of the optimization variables deviating by more than an optimization variable tolerance value from a value of the optimization variable that is achieved by the initial production flow schedule; and for each of the flexible process steps, rescheduling the flexible process step into one of the alternative time windows if the rescheduling is within the at least one availability time window and if, in the original time window of the flexible process step, a lower availability of electrical energy is present than in the alternative time window, in order to obtain an adapted production flow schedule.

2. The method of claim 1, wherein the predetermined minimum energy availability is determined through an availability threshold value, which is a mean value of the forecast energy amount during the optimization period.

3. The method of claim 1, wherein the forecast energy amount is an excess of electrical energy in a power network.

4. The method of claim 1, wherein the one or more alternative time windows of a process step is determined based on a state magnitude of the process step.

5. The method of claim 1, wherein the rescheduling of appropriate flexible process steps is carried out depending on a probability that is assigned to each forecast energy amount.

6. The method according to claim 5, comprising:
giving priority to rescheduling the one or more flexible process steps into relevant time windows in which the probability of an energy availability being above the minimum energy availability is highest.

7. The method according to claim 1, comprising:
giving priority to the rescheduling of appropriate flexible process steps having the highest energy consumption.

8. The method according to claim 1, wherein the one or more alternative time windows is multiple alternative time windows within the optimization window.

9. A production planning system for adapting a production flow schedule for one or more production processes, at least some of the one or more processes including process steps using energy for their execution, wherein the production flow schedule is initially generated depending on an optimization function that optimizes the production processes in relation to one or more optimization variables, and wherein the production planning system is configured to cause a data processing unit;
to identify at least one availability time window in which a predetermined minimum energy availability is present within a predetermined optimization period based on availability information that indicates a forecast energy amount during the optimization period;
to identify one or more process steps that are characterized by time flexibility as flexible process steps, wherein the one or more flexible process steps that can be executed in one or more alternative time windows within the optimization period without at least one of the optimization variables deviating by more than an optimization variable tolerance value from a value of the optimization variable that is achieved by the initial production flow schedule; and
for each of the flexible process steps, rescheduling the flexible process step into one of the alternative time windows if the rescheduling is within the at least one availability time window and if, in the original time window of the flexible process step, a lower availability of electrical energy is present than in the alternative time window, in order to obtain an adapted production flow schedule.

10. The system of claim 9, comprising:
one or more production processes.

11. The system of claim 9, wherein the predetermined minimum energy availability is determined through an availability threshold value, which is a mean value of the forecast energy amount during the optimization period.

12. The system of claim 9, wherein the forecast energy amount is an excess of electrical energy in a power network.

13. The system of claim 9, wherein the one or more alternative time windows of a process step is determined based on a state magnitude of the process step.

14. A computer program product comprising a non-transitory computer readable medium having a computer readable code for adapting a production flow schedule for one or more production processes, at least some of the one or more processes including process steps that use energy for their execution, wherein the production flow schedule is initially generated depending on an optimization function that optimizes the production processes in relation to one or more optimization variables, and wherein the computer readable code will configure a computer to perform a method which includes:
identifying at least one availability time window in which a predetermined minimum energy availability is present within a predetermined optimization period based on availability information that indicates a forecast energy amount during the optimization period;
identifying one or more process steps that are characterized by time flexibility as flexible process steps, wherein the one or more flexible process steps that can be executed in one or more alternative time windows within the optimization period without at least one of the optimization variables deviating by more than an optimization variable tolerance value from a value of the optimization variable that is achieved by the initial production flow schedule; and
for each of the flexible process steps, rescheduling the flexible process step into one of the alternative time windows if the rescheduling is within the at least one availability time window and if, in the original time window of the flexible process step, a lower availability of electrical energy is present than in the alternative time window, in order to obtain an adapted production flow schedule.

15. The computer program product of claim 14, wherein the predetermined minimum energy availability is determined through an availability threshold value, which is a mean value of the forecast energy amount during the optimization period.

16. The computer program product of claim 14, wherein the forecast energy amount is an excess of electrical energy in a power network.

17. The computer program product of claim 14, wherein the one or more alternative time windows of a process step is determined based on a state magnitude of the process step.

18. The computer program product of claim 14, wherein the rescheduling of each of the appropriate flexible process steps is carried out depending on a probability that is assigned to each forecast energy availability.

19. The method of claim 1, wherein it is taken into account, when deciding about those process steps of which the execution can flexibly be moved between alternative time windows, whether the process steps can be interrupted during the performance of the individual process step.

20. The system of claim 9, wherein it is taken into account, when deciding about those process steps of which the execution can flexibly be moved between alternative time windows, whether the process steps can be interrupted during the performance of the individual process step.

21. The computer program product of claim 14, wherein it is taken into account, when deciding about those process steps of which the execution can flexibly be moved between alternative time windows, whether the process steps can be interrupted during the performance of the individual process step.

* * * * *